(No Model.)
C. K. HAMILTON, Jr.
BOTTLE STOPPER.
No. 338,348. Patented Mar. 23, 1886.
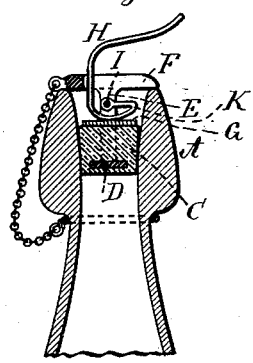
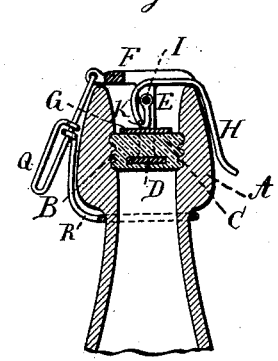
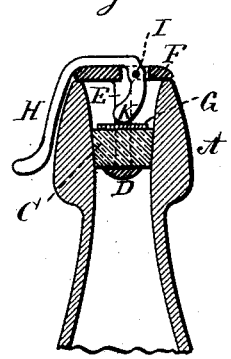
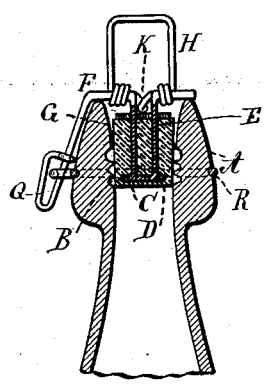
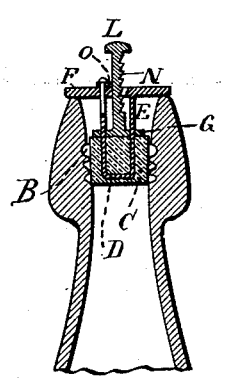
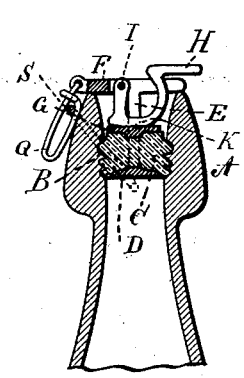
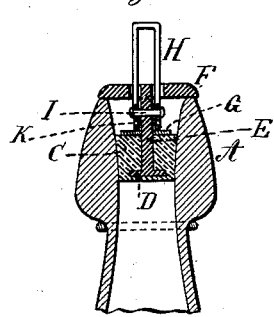
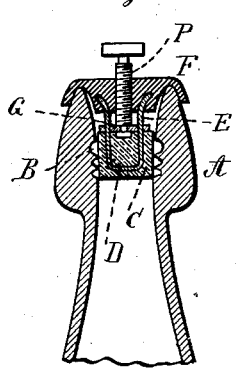
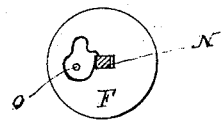
Witnesses:
J. Staib
Chas H. Smith
Inventor:
C. Kennedy Hamilton Jr.
per Lemuel W. Serrell, att.

United States Patent Office.

C. KENNEDY HAMILTON, JR., OF NEW BRIGHTON, NEW YORK.

BOTTLE-STOPPER.

SPECIFICATION forming part of Letters Patent No. 338,348, dated March 23, 1886.

Application filed January 2, 1886. Serial No. 187,346. (No model.)

*To all whom it may concern:*

Be it known that I, C. KENNEDY HAMILTON, Jr., of New Brighton, in the county of Richmond and State of New York, have invented an Improvement in Bottle-Stoppers, of which the following is a specification.

Bottle-stoppers have been made with a plug of india-rubber inserted into the bottle-neck, and in some instances a follower has been used below the rubber stopper, and this follower has been drawn up, so as to spread the rubber laterally by pressure against a disk that rests upon the mouth of the bottle. In this case the follower, acting from below, tends to draw the india-rubber upwardly, and the pressure of gases within the bottle acts in the same direction and tends to lift the rubber stopper, and the resistance of the stopper to this lifting action is usually small.

My invention, as distinguished from the stoppers heretofore employed, relates to a stopper in which the bottom of the rubber plug is supported by a disk or cross-piece in a definite and rigid position in relation to the mouth or upper end of the bottle, and the compressing device acts against the upper surface of the rubber stopper to force the same downwardly into the bottle-neck, and at the same time the diameter of the plug is increased. By this means the pressure of gases within the bottle is more effectually resisted by the rubber plug. The pressure acting upon the inner end of the plug tends to lift the same; but the rubber adhering to the glass, the pressure simply acts to spread the rubber and cause it to adhere more firmly, and the rubber having been compressed from the upper surface, the points of contact between the rubber and the glass may be compared to rows of pawls standing with their points upwardly against the glass and the pressure within the bottle tending to lift the plug, increases the intimacy of contact and the firm hold of the rubber upon the glass.

In the drawings, Figure 1 is a section representing my improved plug as inserted within the bottle-neck and before the same is compressed. Fig. 2 is a similar view with the rubber compressed. Figs. 3 and 4 are sectional views showing modifications in the shape of the cam-lever; and Figs. 5, 6, and 7 are sectional views showing modifications in the devices for compressing the rubber, and Fig. 8 is a section of the device shown in Fig. 1 at right angles thereto. Fig. 9 is a plan view of the stopper shown in Fig. 7, with the head of the stem removed.

The bottle-neck A is of any desired character. It may be smooth upon its interior surface, as seen in Figs. 1 and 3, or it may be roughened or formed with annular groves or indentations, as seen at B. The rubber plug C is of a size to properly fit the interior of the bottle-neck, and it is supported by a disk or head, D, and stem E, extending up to the top piece, F, that rests upon the top or mouth of the bottle, so that when the stopper is introduced the top piece, F, determines the position of the plug C within the bottle-neck. Above the rubber plug C is a follower, G, that is pressed down upon the rubber plug, to spread the same and act to drive the upper end of the plug farther into the bottle. This increases the adhesion between the rubber and the glass, and effectually prevents the pressure of the fluids within the bottle blowing out the stopper, because such pressure tends to increase the adhesion between the rubber and the glass in the manner before described. This follower G is to be driven down and held by suitable mechanical appliances. I prefer to use the lever-handle H, pivoted at I to the stem E or top piece, F, and provided with a cam, K, to force down the follower G, when the lever-handle is turned down against the side of the neck, as seen in Figs. 2 and 3.

The levers and cams in Figs. 1, 2, and 4 are shown as made of wire. In Figs. 3 and 6 they are shown as made of solid metal, the action in both cases being alike. Where the stem E is double, as in Figs. 4, 5, and 7, the cam will be between the two parts of the stem, and where the stem E is double and made of wire and bent outwardly at right angles to form the rest upon the top of the bottle, as in Fig. 4, the wire of the lever H and cam K can be bent, as shown, so as to form pivot-eyes surrounding the wire F, in which case the portions F of the stem-wire E form the pivots.

The lever H and cams K may be double, as seen in Fig. 8, so that two cams will be used, one at each side of the stem E.

The devices shown in Fig. 5 correspond to those before described, with the exception that the follower G is to be actuated by direct pressure upon the knob L and rack-bar N. This rack-bar can be forced inwardly by direct pressure and caught against a tooth upon the bearing-piece F, and an eccentric lock, O, can be turned around against the side of the rack-bar to hold the parts in position; or a spring can be used to press the rack-bar against the tooth.

In Fig. 7 I have represented a screw, P, to act directly upon the follower G and expand the rubber plug, as aforesaid.

The stopper can be connected to the bottle-neck in any desired manner. I have shown a chain to the neck-band in Fig. 1, and the loop Q in Figs. 2, 4, and 6 as connected to the stopper. In Fig. 6 the bail S has ends bent at right angles and entering recesses in the outer surface of the glass, and this bail passes through the loop Q; or there may be a wire around the neck, as at R, Fig. 4, to pass through the loop Q; or such wire R may be made as an eye upon the neck-band, as in Fig. 2. The stem E and metallic parts are preferably completed, and the rubber of the stopper then pressed around the stem and head and cured or vulcanized, and the ends of the stem E, Fig. 7, can be soldered or otherwise secured in the bearing-piece F, and the rubber applied to the stem, as aforesaid.

I claim as my invention—

1. The combination, with the rubber plug C, of the stem E, having a head, D, and the top piece, F, to rest upon the bottle-neck, the follower G, above the rubber plug C, and mechanism, substantially as specified, acting between the top piece, F, and the follower G, to press the follower down and spread the rubber, substantially as specified.

2. The combination, with the rubber plug C, of the two-part stem E, having a head, D, to support the rubber, and the top piece, F, to rest upon the bottle-neck, the follower G, the lever H, and cam K, having eyes through which the top piece, F, passes, substantially as specified.

Signed by me this 31st day of December, A. D. 1885.

C. KENNEDY HAMILTON, JR.

Witnesses:
GEO. T. PINCKNEY,
WILLIAM G. MOTT.